US012120776B2

(12) United States Patent
Aftab et al.

(10) Patent No.: US 12,120,776 B2
(45) Date of Patent: Oct. 15, 2024

(54) SYNCHRONIZATION OF ARTIFICIAL INTELLIGENCE BASED MICROSERVICES

(71) Applicant: AT&T Intellectual Property I, L.P., Atlanta, GA (US)

(72) Inventors: Syed Anwar Aftab, Budd Lake, NJ (US); Manoop Talasila, Somerset, NJ (US); Guy Jacobson, Bridgewater, NJ (US); John F. Murray, Denville, NJ (US); Mazin E. Gilbert, Warren, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 18/177,368

(22) Filed: Mar. 2, 2023

(65) Prior Publication Data

US 2023/0209658 A1    Jun. 29, 2023

Related U.S. Application Data

(63) Continuation of application No. 17/182,418, filed on Feb. 23, 2021, now Pat. No. 11,622,418.

(51) Int. Cl.
*H04W 88/18* (2009.01)
*H04L 5/00* (2006.01)
*H04W 24/02* (2009.01)
*H04W 24/08* (2009.01)
(Continued)

(52) U.S. Cl.
CPC ......... *H04W 88/182* (2013.01); *H04L 5/0048* (2013.01); *H04W 24/02* (2013.01); *H04W 24/08* (2013.01); *H04W 28/0289* (2013.01); *H04W 56/0015* (2013.01)

(58) Field of Classification Search
CPC ... H04W 88/182; H04W 24/02; H04W 24/08; H04W 28/0289; H04W 56/0015; H04L 5/0048
See application file for complete search history.

(56) References Cited

U.S. PATENT DOCUMENTS

2020/0367129 A1* 11/2020 Raheem ............ H04W 28/0268
2021/0144071 A1*  5/2021 Young .................. H04L 41/5003
2022/0086846 A1*  3/2022 Sharma ............... H04W 72/543
(Continued)

*Primary Examiner* — Faruk Hamza
*Assistant Examiner* — Alan L Lindenbaum
(74) *Attorney, Agent, or Firm* — Guntin & Gust, PLC; Kenneth S. Kwan

(57) ABSTRACT

Aspects of the subject disclosure may include, for example, receiving network-related information associated with a first RAN that includes a first RIC, obtaining, from an artificial intelligence (AI) model synchronization system associated with a second RAN, data relating to an AI model deployed by a second RIC of the second RAN, determining, based on the data relating to the AI model and the network-related information associated with the first RAN, that the AI model can be leveraged by the first RAN to improve network performance of the first RAN, performing synchronization with the AI model synchronization system to obtain the AI model, responsive to the determining that the AI model can be leveraged by the first RAN to improve the network performance of the first RAN, and causing the first RIC to deploy the AI model in the first RAN after the performing the synchronization. Other embodiments are disclosed.

20 Claims, 9 Drawing Sheets

(51) Int. Cl.
*H04W 28/02* (2009.01)
*H04W 56/00* (2009.01)

(56) References Cited

U.S. PATENT DOCUMENTS

| | | |
|---|---|---|
| 2022/0210708 A1* | 6/2022 | Parekh .............. H04W 36/0058 |
| 2022/0217781 A1* | 7/2022 | Decarreau ................ G06N 3/08 |
| 2022/0272794 A1 | 8/2022 | Aftab et al. |

* cited by examiner

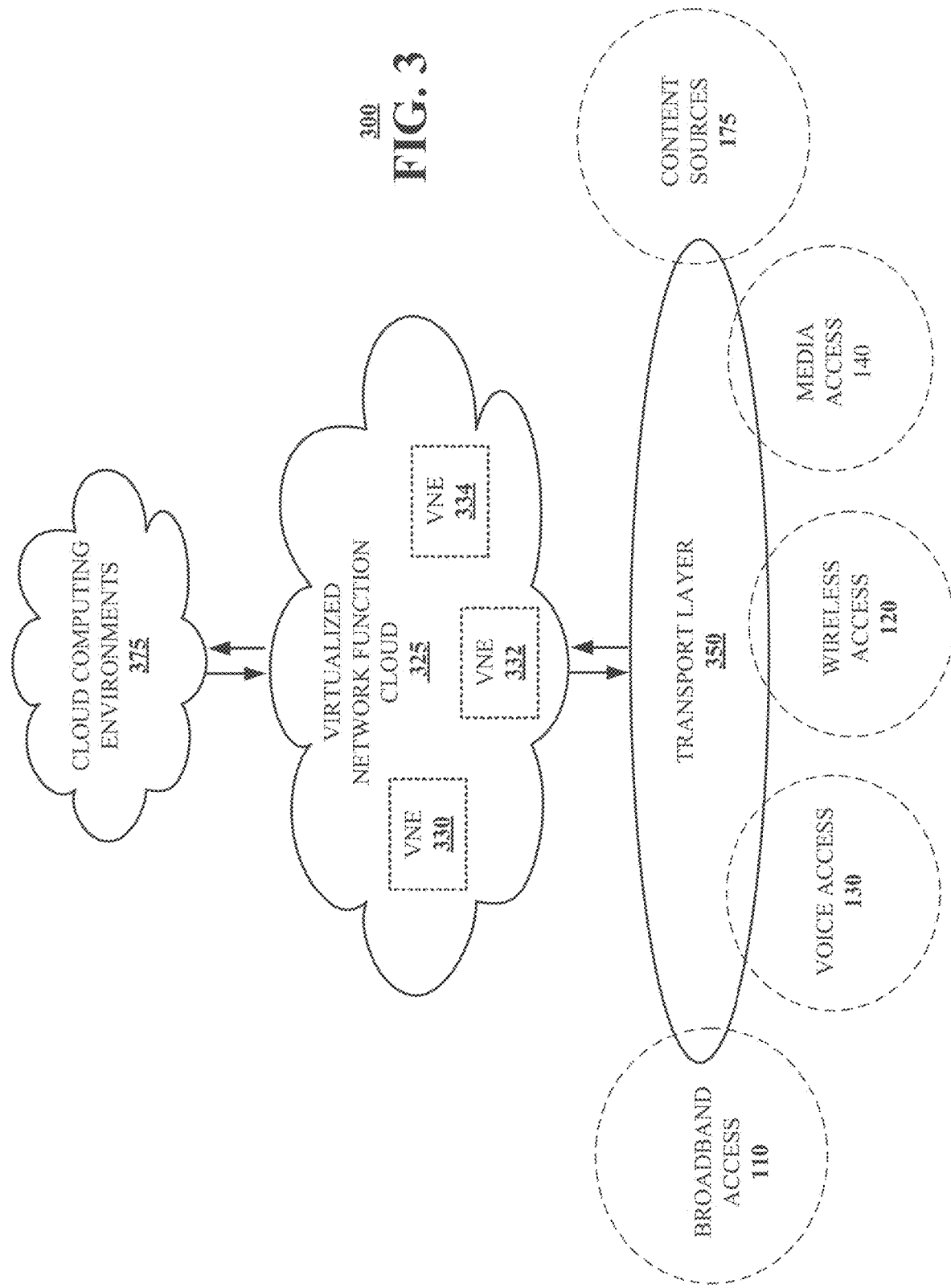

SYNCHRONIZATION OF ARTIFICIAL INTELLIGENCE BASED MICROSERVICES

CROSS REFERENCE TO RELATED APPLICATION

This application is a continuation of and claims priority to U.S. patent application Ser. No. 17/182,418 filed on Feb. 23, 2021. All sections of the aforementioned application are incorporated herein by reference in their entirety.

FIELD OF THE DISCLOSURE

The subject disclosure relates to artificial intelligence (AI)/machine learning (ML) microservices synchronization, sharing, deployment, and automation, for example, in radio access networks (RANs), such as virtualized RANs (vRANs).

BACKGROUND

As network communications technology continues to advance, more AI-based applications are being developed and used to manage network traffic and control network operations.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communications network in accordance with various aspects described herein.

DETAILED DESCRIPTION

Figure 1:
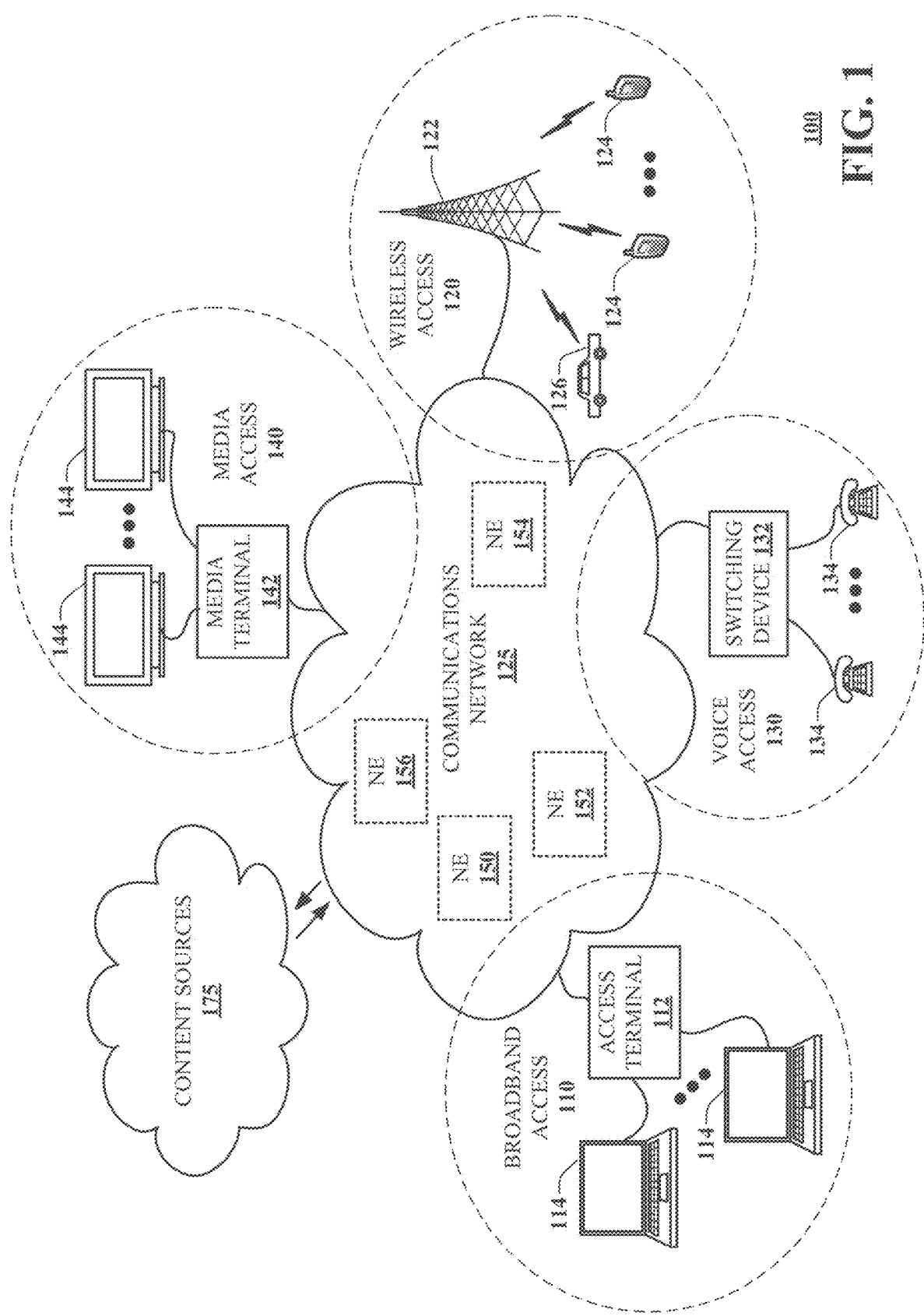
FIG. 1 is a block diagram illustrating an exemplary, non-limiting embodiment of a communications network or system in accordance with various aspects described herein.

The subject disclosure describes, among other things, illustrative embodiments for a system that enables synchronization (e.g., federation), sharing, or exchange of pre-trained and ready-to-use AI (e.g., ML) models among multiple RANs, such as, for example, 5G vRANs.

In exemplary embodiments, a first AI model synchronization system (e.g., a first instance of an AI model synchronization system) is included in, or associated with, a first RAN (e.g., providing coverage in a region) that includes a first RAN intelligent controller (RIC) configured to manage network components using AI models or microservices. A second AI model synchronization system (e.g., a second instance of an AI model synchronization system) is included in, or associated with, a second RAN (e.g., providing coverage in the same region as the first RAN or in a different region) that includes a second RIC configured to manage network components using AI models or microservices. In various embodiments, the first AI model synchronization system is capable of autonomously receiving network-related information associated with the first RAN and, based on the network-related information as well as metadata of AI model(s) that are stored in the second AI model synchronization system (and that are, e.g., deployed at the second RIC of the second RAN), obtaining the AI model(s) from the second AI model synchronization system, and providing the obtained AI model(s) to the first RIC for deployment in the first RAN. In this way, a RAN can leverage another RAN/RIC instance's AI model(s) to address the RAN's own network-related inefficiencies and thereby improve overall network performance in the RAN's coverage area.

In some implementations, a single (e.g., common) instance of an AI model synchronization system, rather than respective instances of AI model synchronization systems, is communicatively coupled to multiple RANs, and is capable of facilitating sharing of AI models among the RANs (or respective RIC instances). In various embodiments, the single AI model synchronization system may periodically (e.g., once a day during off peak hours, such as in the late evening, early morning, or the like; once a week; once a month; etc.), and/or based on one or more policies (e.g., a global policy), analyze network-related information associated with some or all of the RANs, identify AI model(s) deployed in a first RAN (e.g., a first RIC instance) that can be employed by one or more other RANs (e.g., one or more other RIC instances) to attain network performance improvements, and cause the AI model(s) to be propagated from the first RAN (or first RIC instance) to the other RAN(s) (or other RIC instance(s)).

In exemplary embodiments, an AI microservice adapter is capable of adapting AI models or microservices (e.g., standard AI/ML models or microservices and/or the like) to operate within a RIC environment. In various embodiments, the AI microservice adapter may be configured to adapt an AI model or microservice, that is designed for use with Representational State Transfer (REST) or REST-like interfaces, such as Hypertext Transfer Protocol (HTTP)-based remote procedure call (RPC) protocols (e.g., gRPC or the like), to operate in a RIC environment that employs a message-based protocol—e.g., a RIC message router (RMR)-based protocol or the like. In some embodiments, the AI microservice adapter can include a configuration file that identifies microservice information and/or interface specifications or instructions relating to the adaptation process. The microservice information and/or interface specifications or instructions may include, for example, information regarding function(s) offered by an AI microservice, information regarding inputs, information regarding outputs, identification of message(s) to detect for on a bus (e.g., a RIC bus, such as an RMR message bus or the like) that call or utilize function(s) of the AI microservice, identification of message(s) to deliver on the bus relating to function(s) of the AI microservice, information regarding how message(s) are to be translated into calls, information regarding how response(s) to message(s) from the AI microservice are to be translated and placed onto the bus, information regarding endpoint(s) of the AI microservice, information regarding location(s) at which the AI microservice is running, and/or the like.

AI model synchronization among multiple RANs, as described herein, promotes self-management of a network, and enables the network to autonomously and intelligently evolve using AI models trained by other RAN instances over time. This allows the network to continuously improve overall performance and quality, and conserves network resources and time, which might otherwise need to be expended in cases where manual monitoring and intervention of network operations are required to maintain network performance. Synchronizing pre-trained and ready-to-use AI models (e.g., packaged as microservices) between different RAN instances also maximizes reusability of such models, and provides consistent and homogeneous AI microservices offerings across multiple RAN modules.

AI model synchronization, as described herein, also provides an ecosystem or environment that standardizes interfaces (e.g., application programming interfaces (APIs)) and deployment mechanisms, which simplifies the exchange and distribution of AI models not only among RANs of the same network provider, but also between different network providers (e.g., exchanges that can be arranged by way of licensing, sale, or the like). Embodiments of the AI model synchronization interfaces (e.g., APIs) also allow RAN components to track usage of AI models as well as update the AI models (e.g., when a newly trained version of an AI model is available).

Additionally, providing an AI microservice adapter, as described herein, eliminates a need for developers of AI models to acquire specialized knowledge of network-based protocols, such as message-based protocol(s) of a RIC, which lowers or removes barriers to entry for AI model development for network environments.

One or more aspects of the subject disclosure include a device comprising a processing system including a processor, and a memory that stores executable instructions that, when executed by the processing system, facilitate performance of operations, where the processing system is associated with a first radio access network (RAN) that includes a first RAN intelligent controller (RIC). The operations can include receiving network-related information associated with the first RAN, obtaining, from an artificial intelligence (AI) model synchronization system associated with a second RAN, data relating to an AI model deployed by a second RIC of the second RAN, and determining, based on the data relating to the AI model and the network-related information associated with the first RAN, that the AI model can be leveraged by the first RAN to improve network performance of the first RAN. Further, the operations can include performing synchronization with the AI model synchronization system to obtain the AI model, responsive to the determining that the AI model can be leveraged by the first RAN to improve the network performance of the first RAN, and causing the first RIC to deploy the AI model in the first RAN after the performing the synchronization.

One or more aspects of the subject disclosure include a non-transitory machine-readable medium comprising executable instructions that, when executed by a processing system of an artificial intelligence (AI) model synchronization system including a processor, facilitate performance of operations. The operations can include obtaining, based on a global policy, first network-related information associated with a first radio access network (RAN), where the AI model synchronization system is communicatively coupled to a first RAN intelligent controller (RIC) corresponding to the first RAN and a second RIC corresponding to a second RAN. Further, the operations can include identifying, in an AI microservices data structure associated with the second RAN, data relating to an AI model deployed in the second RIC, determining, based on the data relating to the AI model and the first network-related information associated with the first RAN, that the AI model can be employed by the first RAN to improve network performance of the first RAN, obtaining, from the AI microservices data structure, the AI model based on the determining that the AI model can be employed by the first RAN to improve the network performance of the first RAN, and responsive to the obtaining the AI model, causing the AI model to be provided to the first RIC for deployment in the first RAN.

One or more aspects of the subject disclosure include a method. The method can include causing, by a processing system of a first radio access network (RAN) intelligent controller (RIC) of a first RAN including a processor, network-related information associated with the first RAN to be provided to a first artificial intelligence (AI) model synchronization system, where providing the network-related information associated with the first RAN to the first AI model synchronization system enables the first AI model synchronization system to obtain, from a second AI model synchronization system associated with a second RAN, data relating to an AI model deployed by a second RIC of the second RAN, determine, based on the data relating to the AI model and the network-related information associated with the first RAN, that the AI model is capable of improving network performance of the first RAN, and perform synchronization with the second AI model synchronization system to obtain the AI model. Further, the method can include receiving, by the processing system, the AI model from the first AI model synchronization system, responsive to the causing the network-related information associated with the first RAN to be provided to the first AI model synchronization system, and causing, by the processing system, the AI model to be deployed in the first RIC responsive to the receiving the AI model from the first AI model synchronization system.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, synchronization (e.g., federation), sharing, or exchange of pre-trained and ready-to-use AI (e.g., ML) models among multiple RANs, such as, for example, 5G vRANs. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VOIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
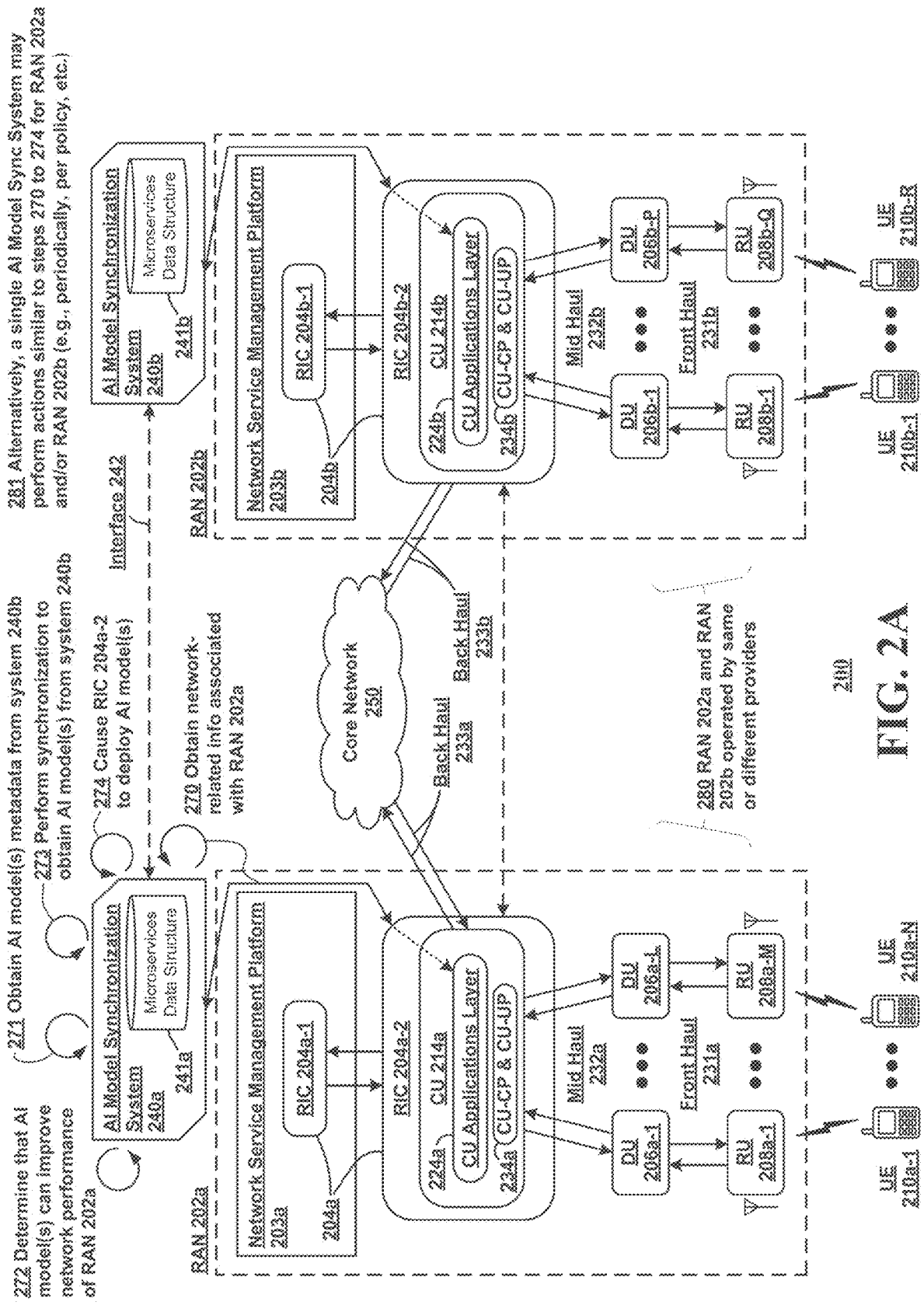
FIG. 2A is a block diagram illustrating an example, non-limiting embodiment of a system functioning within the communications network of FIG. 1 in accordance with various aspects described herein.

FIG. 2A is a block diagram illustrating an example, non-limiting embodiment of a system 200 functioning within, or operatively overlaid upon, the communications network 100 of FIG. 1 in accordance with various aspects described herein. In some embodiments, the system 200 may correspond to, or include, one or more networks (e.g., a communications network, a data network, etc.).

As shown in FIG. 2A, the system 200 may include a RAN 202a and a RAN 202b communicatively coupled to a core network 250. The core network 250 can include a 5G network, an evolved packet core (EPC) network, a higher generation network, or any combination thereof. In various embodiments, one or more of the RAN 202a and the RAN 202b may be, or include, a vRAN (e.g., in an open-RAN (O-RAN) implementation), in which software is decoupled from hardware, and implementation thereof is in accordance with principles of network function virtualization (NFV), where the control plane is separated from the data plane. The vRAN may include a centralized set of baseband units located remotely from antennas and remote radio units, and may be configured to share signaling amongst cells. In various embodiments, the vRAN may provide control and service delivery optimization functions. The system 200 can include various quantities of cells (e.g., Pcells and/or Scells), various quantities of network nodes in a cell, and/or various types of network nodes and/or cells.

As shown in FIG. 2A, the RAN 202a may include a network service management platform 203a and a RIC 204a. The RIC 204a may include a RIC portion 204a-1 implemented, or otherwise incorporated, in the network service management platform 203a. The RIC 204a may include a RIC portion 204a-2 having a centralized unit (CU) 214a (e.g., a gNodeB (gNB) CU or the like) that provides a CU applications layer 224a as well as a CU control plane CU-CP and a CU user plane CU-UP (e.g., represented as CU-CP & CU-UP 234a). In various embodiments, the RIC portion 204a-1 may be configured to operate in non-real-time, and the RIC portion 204a-2 may be configured to operate in near real-time. Similarly, the RAN 202b may include a network service management platform 203b, and a RIC 204b having a RIC portion 204b-1 and a RIC portion 204b-2. The RIC portion 204b-2 may include a CU 214b that provides a CU applications layer 224b and a CU control plane CU-CP and a CU user plane CU-UP (e.g., represented as CU-CP & CU-UP 234b).

As shown in FIG. 2A, the RAN 202a may include distributed units (DUs) 206a-1 through 206a-L (L≥1) (hereinafter referred to collectively as "DUs 206a," and individually as "DU 206a"). In various embodiments, the DUs 206a may include baseband units configured to perform signal processing and/or the like (e.g., gNB DUs or the like). The RAN 202a may also include remote units (RUs) 208a-1 through 208a-M (M≥1) (hereinafter referred to collectively as "RUs 208a," and individually as "RU 208a"). The RUs 208a may communicatively couple (e.g., via an air interface) with user equipment (UEs) 210a-1 through 210a-N (N≥1) (hereinafter referred to collectively as "UEs 210a," and individually as "UE 210a"). In various embodiments, the RUs 208a may include remote radio units, antennas, and/or the like. As shown in FIG. 2A, the RUs 208a, the DUs 206a, and the CU 214a may, by way of a front haul 231a, a mid haul 232a, and a back haul 233a, provide (e.g., controlled) connectivity between the core network 250 and the UEs 210a. Similarly, the RAN 202b may include DUs 206b-1 through 206b-P (P≥1) (hereinafter referred to collectively as "DUs 206b," and individually as "DU 206b"), RUs 208b-1 through 208b-Q (Q≥1) (hereinafter referred to collectively as "RUs 208b," and individually as "RU 208b"), and UEs 210b-1 through 210b-R (R≥1) (hereinafter referred to collectively as "UEs 210b," and individually as "UE 210b"). The RUs 208b, the DUs 206b, and the CU 214b may, by way of a front haul 231b, a mid haul 232b, and a back haul 233b, provide (e.g., controlled) connectivity between the core network 250 and the UEs 210b.

Although FIG. 2A illustrates the CU 214a and the CU 214b being respectively incorporated in the RIC portion 204a-2 and the RIC portion 204b-2, in various embodiments, the CU 214a and the CU 214b may be implemented as distinct components from the RIC portion 204a-2 and the RIC portion 204b-2. In some embodiments, one or more pairs of the RIC 204a and the network service management platform 203a and the RIC 204b and the network service management platform 203b may operate as part of one or more central control planes that oversee a geographic region that can include multiple (e.g., hundreds, thousands, etc.) of remote units, distributed units, centralized units, or any combination thereof.

The system 200 may be functionally separated or segmented in accordance with one or more time-based zones or frames. For example, the network service management platform 203a, the network service management platform 203b, the RIC portion 204a-1, and/or the RIC portion 204b-1 may be operative at or in non-real-time; the RIC portion 204a-2, the RIC portion 204b-2, the CU 214a, and/or the CU 214b may be operative at or in near-real-time; and the DUs 206a, the DUs 206b, the RUs 208a, the RUs 208b, the UEs 210a, and/or the UEs 210b may be operative at or in real-time. As the terms (and related terms) are used herein, real-time operations may occur over a span of fractions of a second up to a second (or the like), near-real-time operations may occur over the course of a few seconds (e.g., 1 to 5 seconds or the like), and non-real-time operations may occur over a time period that is greater than a few seconds (e.g., greater than 5 seconds or the like).

In various embodiments, the network service management platform 203a and/or the network service management platform 203b may manage, or otherwise adapt, RIC behaviors and/or operations across one or more of the three time zones or timeframes described above (e.g., real-time, near-real-time, and non-real-time) on an individualized and/or collective basis. Such management or adaptation of RIC behaviors and/or operations may conform to one or more models or microservices (e.g., AI models or microservices), as described herein. In turn, the RICs may establish and/or modify policies and/or behaviors of respective CUs, DUs, and RUs in accordance with the model(s) or microservice(s). In this regard, the network service management platform 203a and/or the network service management platform 203b may indirectly influence the behaviors and/or operations of CUs, DUs, and/or RUs via one or more RICs.

In some embodiments, the communication channels and/or links between the RAN 202a and the UEs 210a and the communication channels and/or links between the RAN 202b and the UEs 210b may include wireless links. In various embodiments, some or all of the UEs 210a and 210b may be mobile, and may therefore enter and/or exit a service or coverage area associated with the RIC 204a and/or enter and/or exit a service or coverage area associated with the RIC 204b. In various embodiments, some of the UEs 210a and 210b may include non-mobile or stationary devices. In these embodiments, the RAN 202a and/or the RAN 202b may include one or more routers, gateways, modems, cables, wires, and/or the like, and the communication channels and/or links between the RAN 202a and such UEs and/or the communication channels and/or links between the RAN 202b and such UEs may include wired/wireline links, optical links, etc.

In various embodiments, a RIC (e.g., the RIC portion 204a-2 of the RIC 204a, the RIC portion 204b-2 of the RIC 204b, or the like) may store, execute, and/or deploy in or via an applications layer (e.g., the CU applications layer 224a, the CU applications layer 224b, or the like), applications or microservices (e.g., xApps or the like) that are configured to control and manage a RAN (e.g., the RAN 202a, the RAN 202b, or the like). The applications or microservices may relate to radio connection management, mobility management, quality-of-service (QOS) management, interference management, and/or the like. In various embodiments, a RIC may also be configured to execute, or otherwise deploy, models, such as AI (e.g., ML) models, that when executed in one or more containers, provide corresponding microservices. Deployment of a microservice, such as an AI model or microservice, in a RIC (or, more generally, a RAN) may involve, or include, for example, executing or instantiating the AI model in one or more containers in the applications layer of the RIC (e.g., the CU applications layer 224a, the CU applications layer 224b, or the like), such that the AI model processes inputs (e.g., received from other microservices running on the RIC and/or from various components of the RAN (e.g., the CU-CP & CU-UP 234a or 234b, the DUs 206a or 206b, and/or the RUs 208a or 208b)), and provides outputs (e.g., to the other microservices and/or the various components of the RAN), in accordance with the AI model, to control the overall operation of the RAN. Examples of microservices provided by AI model(s) can include those relating to telemetry, network traffic control and/or management, device admissions (e.g., UE admissions control), and/or the like.

As shown in FIG. 2A, the system 200 may include an AI model synchronization system 240a communicatively coupled to the RIC 204a (e.g., the RIC portion 204a-2), and an AI model synchronization system 240b communicatively coupled to the RIC 204b (e.g., the RIC portion 204b-2). In various embodiments, the AI model synchronization system 240a may be included as part of the RAN 202a and the AI model synchronization system 240b may be included as part of the RAN 202b. As shown in FIG. 2A, the system 200 may include an interface 242 that communicatively couples the AI model synchronization system 240a and the AI model synchronization system 240b, which enables exchange of communications and data, such as AI models, metadata, and/or the like.

The AI model synchronization system 240a may include a microservices data structure 241a (e.g., a catalog, a repository, a registry, or the like) that is configured to store AI models and associated information, such as metadata and/or the like. The microservices data structure 241a may be implemented in a database, a table, a trie, a linked list, an array, and/or the like. The AI model synchronization system 240b may include a similar microservices data structure 241b. Metadata of an AI model may include, for example, (e.g., update-to-date) telemetry data, network performance information (e.g., relating to latency, packet loss, throughput, bandwidth (e.g., available bandwidth), jitter, and/or the like), network traffic information (e.g., relating to traffic levels, traffic patterns, traffic densities, and/or the like), information regarding performance of the AI model under one or more operating conditions, information regarding performance of the AI model across one or more configurations of the AI model, and/or the like.

In various embodiments, training of an AI model may involve deploying the AI model in a RAN (e.g., via the RIC portion 204a-2 of the RAN 202a, the RIC portion 204b-2 of the RAN 202b, or the like, in a manner similar to that described above), obtaining data relating to outputs as a result of deployment of the AI model (e.g., data, such as measurements, network performance information, network traffic information, etc., provided via telemetry and/or analytics function(s), such as a data collection and analytics element (e.g., which may include a data broker, a model runner, and/or the like)), and updating parameter(s) and/or metadata of the AI model based on the data relating to the outputs.

In various embodiments, the system 200 of FIG. 2A may enable synchronization (e.g., federation), sharing, or exchange of pre-trained and ready-to-use AI (e.g., ML) models among the multiple RANs. In this regard, an AI model that is trained (and, e.g., continuously updated) and deployed by a first RAN to control the behavior of a first cell tower or towers covering a first geographic region (e.g., a first city or the like) may be obtained by a second RAN (which may lack such an AI model and/or appropriate training data or updates for such an AI model) for use with a second cell tower or towers covering a second geographic region (e.g., a second city or the like), to address network-related issues or inefficiencies experienced in the second geographic region. The second RAN can, for example, identify, select, and/or obtain the AI model based on an analysis (e.g., a comparison) of metadata of the AI model and network-related information associated with the second cell tower(s) and based on determining (according to results of the analysis) that the AI model is capable of providing microservice(s) in a manner that improves overall network performance in the second geographic region. AI model synchronization among multiple RANs, as described herein, promotes self-management of a network, and enables the network to autonomously (e.g., without user intervention) and intelligently evolve using AI models trained by other RAN instances over time.

As shown by reference number 270 in FIG. 2A, the AI model synchronization system 240a can obtain network-related information associated with the RAN 202a. The network-related information can include, for example, telemetry data, network performance information (e.g., latency, packet loss, throughput, bandwidth (e.g., available bandwidth), jitter, and/or the like), network traffic information (e.g., traffic levels, traffic patterns, traffic densities, types of data traffic (e.g., across different areas of a coverage region), rates of increases and/or decreases in data traffic, etc.), and/or the like.

In various embodiments, the AI model synchronization system 240a can receive the network-related information from one or more devices or components of the RAN 202a, such as the network service management platform 203a, the RIC 204a, the CU 214a, one or more of the DUs 206a, and/or one or more of the RUs 208a.

As shown by reference number 271, the AI model synchronization system 240a can obtain AI model metadata from the AI model synchronization system 240b. In various embodiments, obtaining of AI model metadata can be effected using a client-server configuration, where, for example, the AI model synchronization system 240a (functioning as a client) sends one or more requests (e.g., over the interface 242) to the AI model synchronization system 240b (functioning as a server) for metadata relating to one or more AI models stored in the microservices data structure 241b, and the AI model synchronization system 240b, based on the request(s), extracts the metadata and transmits the extracted metadata (e.g., over the interface 242) to the AI model synchronization system 240a.

As shown by reference number 272, the AI model synchronization system 240a can determine that one or more AI models can be used to improve network performance of the RAN 202a. For example, the AI model synchronization system 240a can perform an analysis of the metadata of an AI model and the network-related information associated with the RAN 202a, and determine, based on a result of the analysis, that the AI model (if deployed in the RAN 202a) would improve network performance of the RAN 202a (e.g., would provide efficient traffic management similar to that provided by the AI model in the RAN 202b, would provide throughput similar to that provided by the AI model in the RAN 202b, would facilitate efficient resource allocation similar to that facilitated by the AI model in the RAN 202b, and/or the like).

As shown by reference number 273, the AI model synchronization system 240a can perform synchronization with the AI model synchronization system 240b to obtain the AI model from the AI model synchronization system 240b. In various embodiments, synchronization can similarly be effected using a client-server configuration, where, for example, the AI model synchronization system 240a (functioning as the client) submits a request for the AI model (e.g., over the interface 242) to the AI model synchronization system 240b (functioning as the server), and the AI model synchronization system 240b responds to the request (e.g., over the interface 242) with the AI model.

It is to be appreciated that synchronization (or federation) can be effected using any suitable method. In exemplary implementations, synchronization can be facilitated via one or more application programming interfaces (APIs). In some embodiments, synchronization can be performed via a synchronization gateway mechanism, as described in more detail below. In some embodiments, synchronization can be performed based on other data transfer protocol(s), mechanism(s), or configuration(s), such as via file transfer protocol (FTP), transfer mechanisms involving one or more transport layers, and/or the like. Regardless of how synchronization is performed, the AI model synchronization system 240a can obtain an AI model (e.g., including some or all of the AI model's associated files, parameters, and/or the like) from the AI model synchronization system 240b.

As shown by reference number 274, the AI model synchronization system 240a can cause the RIC 204a (e.g., the RIC portion 204a-2) to deploy the AI model. For example, the AI model synchronization system 240a can provide the AI model to the RIC 204a (e.g., to the RIC portion 204a-2) for installation and execution in the CU applications layer 224a. By executing, or otherwise deploying, the AI model, microservice(s) of the AI model can be employed to manage components of the RAN 202a, such as the CU-CP & CU-UP 234a, the DUs 206a, and/or the RUs 208a. In various embodiments, deployment of the AI model in the RAN 202a may involve, or include, executing or instantiating the AI model in one or more containers in the CU applications layer 224a, such that the AI model processes inputs (e.g., received from other microservices running on the RIC 204a and/or from various components of the RAN 202a (e.g., the CU-CP & CU-UP 234a, the DUs 206a, and/or the RUs 208a)), and provides output(s) (e.g., to the other microservices and/or the various components of the RAN 204a), in accordance with the AI model, to control the overall operation of the RAN 204a. As an example, in a case where the AI model is configured to provide network traffic management to avoid or minimize dropped service—e.g., by controlling allocation of bandwidth to UEs depending on whether the current network traffic level exceeds, or falls below, a threshold—deployment of the AI model in the RAN 204a may yield output(s) (e.g., instructions, tables, and/or the like) that cause the CU-CP & CU-UP 234a, the DUs 206a, and/or the RUs 208a to allocate different amounts of bandwidth depending on the network traffic level (e.g., more bandwidth when the network traffic level exceeds the threshold, less bandwidth when the network traffic level is below the threshold, and/or the like). As another example, in a case where the AI model is configured to provide network traffic management by limiting or restricting a certain type of network traffic (e.g., during a particular time period) so as to reserve more network resources for other types of network traffic, deployment of the AI model in the RAN 204a may yield output(s) (e.g., instructions, tables, and/or the like) that cause the CU-CP & CU-UP 234a, the DUs 206a, and/or the RUs 208a to limit or prevent flow of that type of network traffic (e.g., during that particular time period). As yet another example, in a case where the AI model is configured to provide UE admissions and/or resource allocation control function(s) by allocating different amounts of network resources (e.g., bandwidth or the like) depending on associated subscriber plans, QoS requirements, and/or the like, deployment of the AI model in the RAN 204a may yield outputs (e.g., instructions, tables, and/or the like) that cause the CU-CP & CU-UP 234a, the DUs 206a, and/or the RUs 208a to allocate different amounts of network resources to different UEs depending on the UEs' associated subscriber plans, QoS requirements, and/or the like. In this way, a first RAN can leverage a second RAN's AI model(s) to improve various aspects of a network, including network traffic management, throughput, resource allocation, and/or the like.

In the examples described above with respect to reference numbers 270 to 274, the AI model synchronization system 240a is capable of functioning as a client and the AI model synchronization system 240b is capable of functioning as a server in a client-server relationship. It should be appreciated that the client-server relationship can also be reversed, where the AI model synchronization system 240a may additionally, or alternatively, be capable of functioning as a server and the AI model synchronization system 240b may additionally, or alternatively, be capable of functioning as a client. In this way, either of the AI model synchronization systems 240a and 240b can obtain AI model(s) from the other and provide AI model(s) to the other, enabling bidirectional AI microservices exchanges for improved overall network performance across the RANs.

It is to be understood and appreciated that, although reference numbers 270 to 274, pertaining to various processes and/or actions (e.g., relating to sharing and/or transfer of AI model(s) between different RANs or RICs), are described herein in a particular order, some of these processes and/or actions may occur in different orders and/or concurrently with other processes and/or actions from what is depicted and described herein. Moreover, not all of these processes and/or actions may be required to implement the systems and/or methods described herein. It is also to be understood and appreciated that the system 200 can employ configurations of AI model synchronization system(s) different from that shown in FIG. 2A.

As an example, in some embodiments, the request(s) for metadata, described above with respect to reference number 271, may include network-related parameters, such as telemetry data or information derived based on telemetry data (e.g., desired network performance metrics relating to throughput, available bandwidth, etc.), which the AI model synchronization system 240b may utilize to identify AI model(s) in the microservices data structure 241b. In these cases, the AI model synchronization system 240b can, for example, analyze the metadata of AI model(s) in the microservices data structure 241b by comparing network telemetry and/or performance data therein and the network-related parameters included in the request(s), and determine whether one or more AI models (if deployed in the RAN 202a) would improve network performance at the RAN 202a. The AI model synchronization system 240b can, based on identifying a suitable AI model in this manner, respond to the request(s) by transmitting, to the AI model synchronization system 240a, an identifier of the AI model (e.g., enabling the AI model synchronization system 240a to submit a request for the AI model), metadata of the AI model (e.g., enabling the AI model synchronization system 240a to perform its own analysis of the metadata, such as that described above with respect to reference number 272), and/or the AI model (e.g., enabling the AI model synchronization system 240a to deploy the AI model in the RAN 202a).

As another example, and as shown by reference number 280, the RAN 202a and the RAN 202b may be operated by the same network provider (e.g., the same mobile network operator) or alternatively, by different network providers (e.g., different mobile network operators). In the latter case, the RAN 202a and the RAN 202b may be communicatively coupled to different core networks provided by the different network providers. In such a case, the respective AI model synchronization systems 240a and 240b may be communicatively coupled to one another via one or more interfaces (e.g., similar to the interface 242) configured to enable the different network providers to exchange (e.g., via synchronization or the like in manner(s) similar to those described elsewhere herein) deployed and trained AI models or microservices.

As a further example, although synchronization, sharing, or exchanging of AI models between RANs is described in examples above as involving multiple AI model synchronization systems (or multiple instances of an AI model synchronization system), and as being facilitated by an interface (e.g., the interface 242) between the AI model synchronization systems, other configurations or implementations are possible. For instance, and although not shown, in some implementations, the RAN 202a and the RAN 202b may be communicatively coupled or integrated with a single (e.g., common) instance of an AI model synchronization system rather than respective instances of AI model synchronization systems. In such implementations, and as shown by reference number 281, the single AI model synchronization system may be configured to perform actions (e.g., for any RAN, such as the RAN 202a and/or the RAN 202b) similar to some or all of those described above with respect to reference numbers 270 to 274. For example, the single AI model synchronization system may periodically (e.g., once a day during off peak hours, such as in the late evening, early morning, or the like; once a week; once a month; etc.), or based on one or more policies (e.g., a global policy or the like), analyze network-related information associated with one or more of the RANs, identify AI model(s) deployed in a particular RIC instance (and/or stored in a microservices data structure associated with the particular RIC instance) that can be leveraged by one or more other RIC instances, and cause the AI model(s) to be propagated from the particular RIC instance to the other RIC instance(s) for deployment.

In some implementations, a network service management platform (e.g., the network service management platform 203a, the network service management platform 203b, or the like) may be configured to perform some or all of the functions of an AI model synchronization system (e.g., the AI model synchronization system 240*a* or the AI model synchronization system 240*b*), such as some or all of the example actions described above with respect to reference numbers 270 to 274. In such embodiments, the system 200 may include an interface, for example, between the network service management platform 203*a* and the network service management platform 203*b*, and may or may not include the AI model synchronization system 240*a* or the AI model synchronization system 240*b*.

In other implementations, operations and configurations of the RICs and/or other elements of the RAN architecture may be coordinated or managed via a RIC-to-RIC interface (e.g., an interface between the RIC 204*a* and the RIC 204*b*). One or more of the RICs 204*a* and 204*b* may form a part of a control plane associated with the system 200, and may coordinate service and/or coverage with respect to one or more areas or regions (e.g., cells) of the system 200. Collectively, the RICs 204*a* and 204*b* may coordinate service and/or coverage for the entirety of the system 200. In such implementations, for example, instances of an AI model synchronization system (e.g., the AI model synchronization system 240*a* and the AI model synchronization system 240*b*) may communicate with one another over the RIC-to-RIC interface (e.g., in addition to, or as an alternative to, the interface 242).

As described above with respect to reference number 273, in some embodiments, synchronization of AI models between different RANs can be performed via a synchronization gateway mechanism. In various embodiments, a model synchronization gateway may be a component of an instance (e.g., an instance of an AI model synchronization system, such as the AI model synchronization system 240*a* and/or the AI model synchronization system 240*b*, or an instance of an AI model) that is configured to facilitate communications, such as exchanges of AI models and related information, with other instances (e.g., with corresponding model synchronization gateways of such other instances) and/or compatible systems (e.g., adapter(s) to a RAN). In some embodiments, the model synchronization gateway may, from a logical and a deployment perspective, be located on a borderline of an instance. From a logical perspective, the model synchronization gateway serves as the point of control for AI model flow in and out of an instance. From a deployment perspective (e.g., within an enterprise environment), the model synchronization gateway may be deployed at an edge of a network (e.g., a demilitarized zone (DMZ) of a network), and may include an internal communication interface—i.e., a local (or private) interface—with the enterprise network (e.g., where components of the instance may be deployed) and an external communication interface—i.e., a synchronization (or public) interface—with the external environment (e.g., where other instances may be deployed). In some implementations, the model synchronization gateway may define and/or offer a set of APIs (e.g., REST-based APIs or the like) on the synchronization interface for gateway-to-gateway (or gateway-to-adapter) communication, and another set of APIs (e.g., REST-based APIs or the like) on the local interface for component-to-gateway communication.

In some embodiments, the synchronization interface may be configured to operate in a pull-based fashion. In these embodiments, (e.g., only) a server side may be defined by the synchronization interface APIs, and a client side may interact with the server side on a subscription basis. For example, a subscription may define, via selector(s), one or more solutions (e.g., microservices, such as those provided by one or more AI models, or the like) that the client desires, and the client may poll (e.g., periodically, based on one or more conditions being satisfied, based on user input, and/or the like) to detect appropriate or matching solutions and/or any updates or new solutions. In such implementations, responsibility for obtaining solutions of interest rests on the client (e.g., the interested party), where the server side may not be defined to assume any shared state or provide for any (e.g., automatic) synchronization.

In some embodiments, synchronization may require a pre-provisioned peer on the server side, and may employ both client and server authentication (e.g., certificate authority-based) principals for certificate matching.

In various embodiments, synchronization and exchange of AI models between RANs may involve processes and/or entities, including, for example, synchronization peer(s), handshaking, subscription(s), model synchronization process(es), and synchronization mechanism(s).

A synchronization peer is an entity that supports the synchronization interface. Peer information may be provisioned in a component that provides transparent database access to all other components of a system, such as a microservices data structure (e.g., the microservices data structure 241*a* or 241*b*), a common data services (CDS), and/or the like.

Establishment of a peer relationship—e.g., handshake—may be performed out-of-band, where certificate information may be exchanged. For example, network site administrators (e.g., administrators of a RAN (e.g., the RAN 202*a* or 202*b*), a RIC (e.g., the RIC 204*a* or 204*b*), an AI model synchronization system (e.g., the AI model synchronization system 240*a* or 240*b*), and/or the like) with adequate permissions may exchange interface information, such as API (e.g., REST-based APIs or the like) endpoint coordinates, expected principal information, and/or the like, and may perform local peer provisioning through a portal synchronization administration page.

A synchronization subscription may identify model(s) that an instance is interested in importing from a peer. A subscription may primarily be a selector over a peer's list of models, and can support a variety of scopes, ranging from pinpointing a particular solution to identifying all available solutions. Subscriptions may be subject to policies in a peer that specify access restrictions (e.g., identifying which AI models may be accessible to which external instances or clients). Subscriptions may be associated with a refresh period, may include selective subscriptions (e.g., where certain portions or aspects of an AI model may be provided) or full subscriptions (e.g., where an entirety of an AI model may be provided).

Behavior of the model synchronization gateway may be driven by peer and subscription information provisioned in the microservices data structure (e.g., the microservices data structure 241*a* or 241*b*) and/or the CDS. Through the local interface API, other components of an instance may be able to trigger the model synchronization gateway's behavior, such as triggering interactions with peers (e.g., including triggering sharing of any updates to an AI model that has previously been shared with a peer, or the like). Peer information may identify all other instances (or other adapters) with which a system has agreed to communicate and exchange AI models. A handshake procedure, by which two systems agree to communicate and provision the required information, can take place "out-of-band" (e.g., via e-mail, etc., including provisioning) or "in-band" (e.g., involving a combination of REST API-based synchronization and provisioning actions).

In some embodiments, upon enabling synchronization, an instance agrees to share its public, validated AI models (e.g., including any revisions thereto) with the instance's peers. Selective sharing controls (e.g., relating to AI catalog access and/or synchronization) may be driven by user access controls or peer access controls/restrictions. Establishing a relationship may not, in itself, imply that any exchange of information actually takes place. Information exchange of models may be driven by subscriptions provisioned in the local microservices data structure (e.g., the microservices data structure 241*a* or 241*b*) and/or the CDS. In various embodiments, a peer may be responsible for pulling, from peer instances, the AI models that the peer is interested in. A subscription with a peer represents a subset of that peer's AI model set that an instance is interested in. Subscription information may drive the behavior of the model synchronization gateway (e.g., which performs the actual peer polling and local provisioning of retrieved information). In some cases, no subscription information may be shared between peers. In various embodiments, an instance may have multiple subscriptions with another peer. A subscription may range from one specific model to all the models that a peer exposes (e.g., with any combination of AI model level selection criteria). A subscription may also specify options such as a frequency at which the model synchronization gateway should check for updates, a quantity of model information that should be retrieved each time, etc. It is to be understood and appreciated that the model synchronization gateway mechanisms for AI model information exchange does not impose an overall peer organization or deployment architecture. That is, the model synchronization gateway mechanisms may be employed in a variety of organization configurations, such as configurations involving tree-like structures, fully or sparse connected graphs, etc.

Prior to interaction with a peer, peer information may need to be provisioned in the local microservices data structure (e.g., the microservices data structure 241*a* or 241*b*) and/or the CDS. The model synchronization gateway may serve a dual role—e.g., as a server when responding to requests from peers, and as a client when requesting information therefrom. The model synchronization gateway may employ mutual authentication protocols (e.g., Hypertext Transfer Protocol Secure (HTTPS), Transport Layer Security (TLS), and/or the like), such that, when a connection is established between two gateways, both sides may need to present respective certificates (e.g., signed by accepted certificate authorities, and so on). As an example, no passwords or other credentials provisioned/exchanged may be used for authentication, but rather a subjectName entry in a certificate received from a peer may identify the peer against the locally provisioned peer collection (e.g., in the microservices data structure or CDS) for authentication purposes.

In various embodiments, the model synchronization gateway may periodically process a list of locally provisioned peers, and where subscriptions with a peer are identified from the processing, the subscriptions are assigned to tasks that involve querying the peer with corresponding subscription selector(s). An AI model, obtained via subscription, may be compared (e.g., by the AI model synchronization system, such as the AI model synchronization system 240*a* or 240*b*) against any locally available AI model information (e.g., in a microservices data structure (e.g., the microservices data structure 241*a* or 241*b*) and/or the CDS), and a new model and/or new revisions (e.g., including artifacts) may be fetched and provisioned.

It is to be understood and appreciated that the quantity and arrangement of systems, data structures, platforms, controllers, centralized units, control planes, user planes, distributed units, remote units, UEs, and networks shown in FIG. 2A are provided as an example. In practice, there may be additional systems, data structures, platforms, controllers, centralized units, control planes, user planes, distributed units, remote units, UEs, and/or networks, fewer systems, data structures, platforms, controllers, centralized units, control planes, user planes, distributed units, remote units, UEs, and/or networks, different systems, data structures, platforms, controllers, centralized units, control planes, user planes, distributed units, remote units, UEs, and/or networks, or differently arranged systems, data structures, platforms, controllers, centralized units, control planes, user planes, distributed units, remote units, UEs, and/or networks than those shown in FIG. 2A. For example, the system 200 can include more or fewer systems, data structures, platforms, controllers, centralized units, control planes, user planes, distributed units, remote units, UEs, and/or networks, etc. In practice, therefore, there can be hundreds, thousands, millions, billions, etc. of such systems, data structures, platforms, controllers, centralized units, control planes, user planes, distributed units, remote units, UEs, or networks. In this way, example system 200 can coordinate, or operate in conjunction with, a set of devices and/or operate on data sets that cannot be managed manually or objectively by a human actor. Furthermore, two or more systems, data structures, platforms, controllers, centralized units, control planes, user planes, distributed units, remote units, UEs, and/or networks shown in FIG. 2A may be implemented within a single system, data structure, platform, controller, centralized unit, control plane, user plane, distributed unit, remote unit, UE, or network, or a single system, data structure, platform, controller, centralized unit, control plane, user plane, distributed unit, remote unit, UE, or network shown in FIG. 2A may be implemented as multiple, distributed systems, data structures, platforms, controllers, centralized units, control planes, user planes, distributed units, remote units, UEs, or networks. Additionally, or alternatively, a set of systems, data structures, platforms, controllers, centralized units, control planes, user planes, distributed units, remote units, UEs, or networks of the system 200 may perform one or more functions described as being performed by another set of systems, data structures, platforms, controllers, centralized units, control planes, user planes, distributed units, remote units, UEs, or networks of the system 200.

Figure 2B:
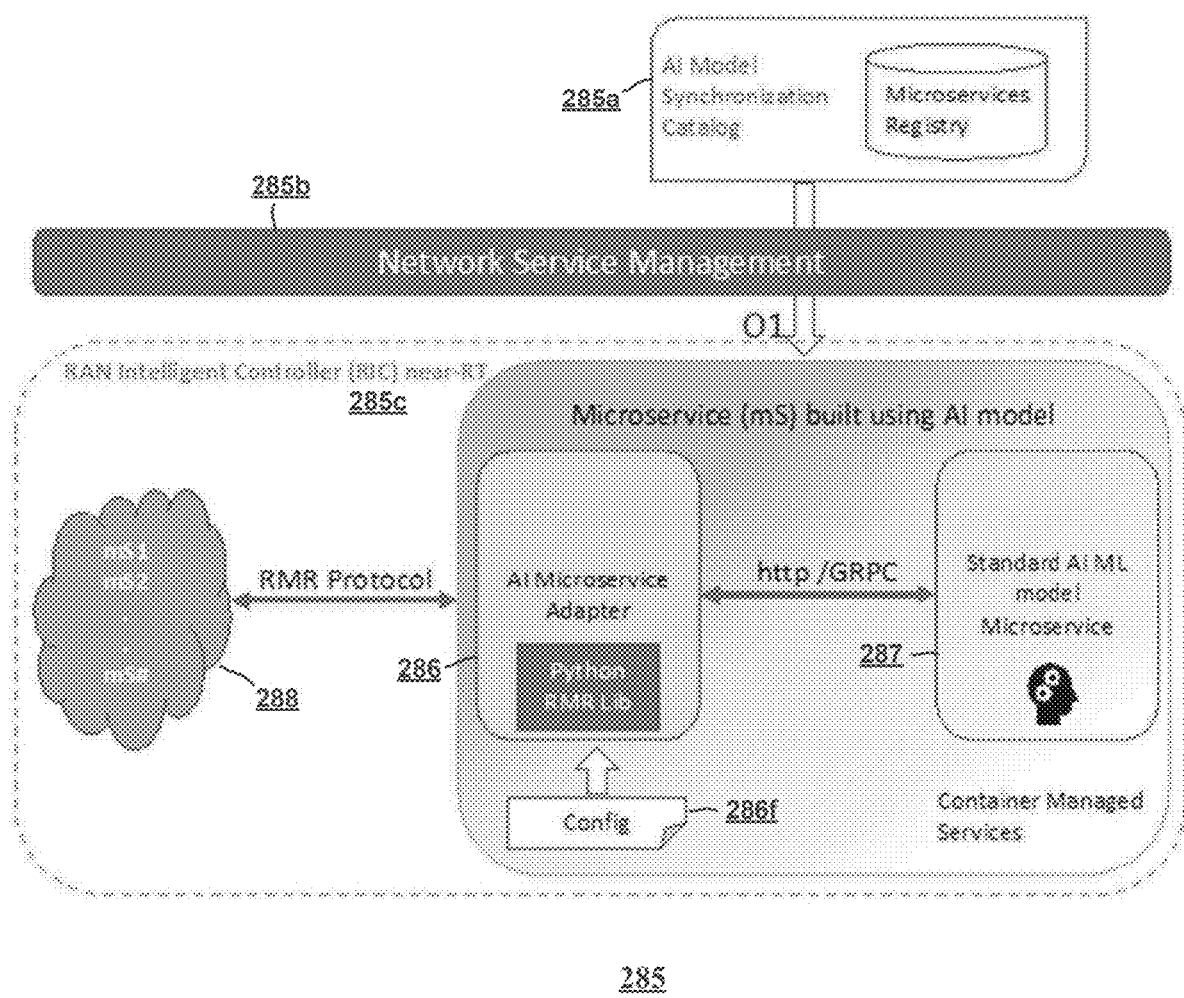
FIG. 2B is a block diagram illustrating an example, non-limiting embodiment of a system functioning in, or in conjunction with, the communications network of FIG. 1 and/or the system of FIG. 2A in accordance with various aspects described herein.

FIG. 2B is a block diagram illustrating an example, non-limiting embodiment of a system 285 functioning in, or in conjunction with, the communications network 100 of FIG. 1 and/or the system 200 of FIG. 2A in accordance with various aspects described herein. In various embodiments, the system 285 can correspond to, include, or be included in, the system 200 of FIG. 2A. For example, the AI model synchronization catalog 285*a* can correspond to the AI model synchronization system 240*a* or 240*b* of FIG. 2A, the network service management 285*b* can correspond to the network service management platform 203*a* or 203*b* of FIG. 2A, and the RIC 285*c* can correspond to the RIC 204*a* (e.g., the RIC portion 204*a*-2) or the RIC 204*b* (e.g., the RIC portion 204*b*-2).

As shown in FIG. 2B, the RIC 285*c* can be equipped with an AI microservice adapter 286 configured to adapt AI (e.g., standard AI/ML) models or microservices to operate within the RIC 285*c* environment. In various embodiments, the AI microservice adapter 286 may be configured to adapt an AI model or microservice 287, that is designed for use with REST or REST-like interfaces, such as Hypertext Transfer Protocol (HTTP)-based remote procedure call (RPC) protocols (e.g., gRPC or the like), to operate in the RIC 285c environment (e.g., with other microservices 288 executing in the RIC 285c) that employs a message-based protocol—e.g., a RIC message router (RMR)-based protocol or the like. In some embodiments, the AI microservice adapter 286 can include a configuration file 286f that identifies microservice information and/or interface specifications or instructions relating to the adaptation process. The microservice information and/or interface specifications or instructions may include, for example, information regarding function(s) offered by an AI microservice (e.g., the AI model or microservice 287), information regarding inputs, information regarding outputs, identification of message(s) to detect for on a bus (e.g., a RIC bus, such as an RMR message bus or the like) that call or utilize function(s) of the AI microservice, identification of message(s) to deliver on the bus relating to function(s) of the AI microservice, information regarding how message(s) are to be translated into calls, information regarding how response(s) to message(s) from the AI microservice are to be translated and placed onto the bus, information regarding endpoint(s) of the AI microservice, information regarding location(s) at which the AI microservice is running, and/or the like.

In various embodiments, the AI microservice adapter 286 can be packaged, or otherwise configured, to run as an application (e.g., as an xApp or the like) that enables non-message-based AI microservices to operate in a RAN and communicate with other elements or components of the RAN, including, for example, other microservices running on the RIC 285c (e.g., microservices 288). In some embodiments, the AI microservice adapter 286 can be provided as a separate protocol-conversion microservice (e.g., as RMR interface code) that is packaged along with the AI model or microservice 287 in a group of containers deployed together (e.g., as a multi-container microservice (mS)). These embodiments offer flexibility since the AI microservice adapter 286 can be used to adapt any AI microservice for use within the RIC 285c. In some embodiments, the AI microservice adapter 286 (e.g., the RMR interface code) can be packaged into the AI model or microservice 287, where the AI microservice adapter 286 and the AI model or microservice 287 are deployed in a single container, and configured to interface with one another via an intra-container link (e.g., using programmatic function calls or the like) or executed as multiple processes in the same container, to provide an "RMR-speaking" interface. These embodiments may involve the development of different model runners for a different languages or types of AI/ML models being adapted, but provide efficiency by eliminating a need for internal communication overhead.

Providing an adapter, such as the AI microservice adapter 286 eliminates a need for developers of AI models to acquire specialized knowledge of network-based protocols, such as message-based protocol(s) of a RIC, which lowers or removes barriers to entry for AI model development for network environments.

Figure 2C:
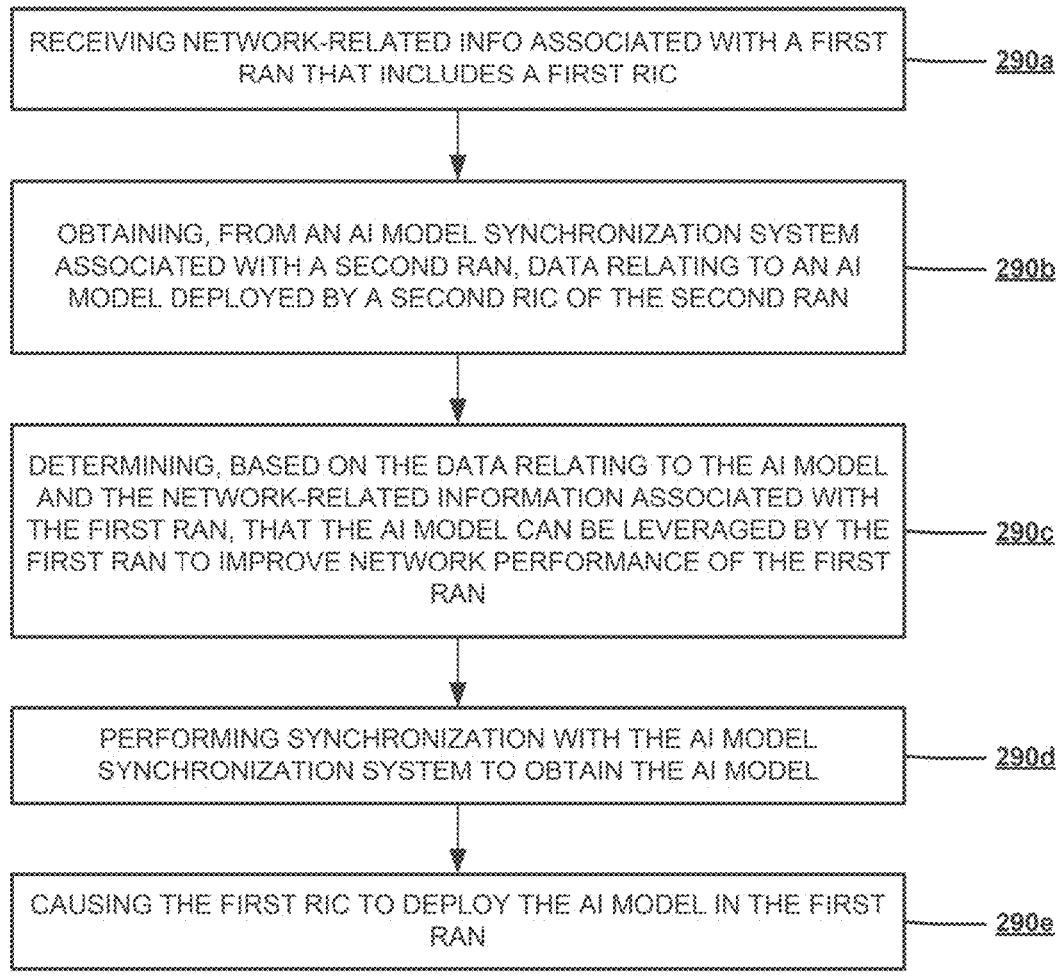
FIG. 2C depicts an illustrative embodiment of a method in accordance with various aspects described herein.

FIG. 2C depicts an illustrative embodiment of a method 290 in accordance with various aspects described herein. In some embodiments, one or more process blocks of FIG. 2C can be performed by an AI model synchronization system, such as the AI model synchronization system 240a or the AI model synchronization system 240b. In some embodiments, one or more process blocks of FIG. 2C may be performed by another device or a group of devices separate from or including the AI model synchronization system, such as the microservices data structure 241a and/or 241b, the RAN 202a and/or 202b, the network service management platform 203a and/or 203b, the RIC 204a and/or 204b, the RIC portion 204a-1 and/or 204b-1, the RIC portion 204a-2 and/or 204b-2, the CU 214a and/or 214b, the CU applications layer 224a and/or 224b, the CU-CP & CU-UP 234a and/or 234b, the DUs 206a and/or 206b, the RUs 208a and/or 208b, the UEs 210a and/or 210b, etc.

At 290a, the method can include receiving network-related information associated with a first RAN that includes a first RIC. For example, the AI model synchronization system 240a can receive network-related information associated with a first RAN that includes a first RIC in a manner similar to that described above with respect to the system 200 of FIG. 2A and/or the system 285 of FIG. 2B.

At 290b, the method can include obtaining, from an AI model synchronization system associated with a second RAN, data relating to an AI model deployed by a second RIC of the second RAN. For example, the AI model synchronization system 240a can obtain, from an AI model synchronization system associated with a second RAN, data relating to an AI model deployed by a second RIC of the second RAN in a manner similar to that described above with respect to the system 200 of FIG. 2A and/or the system 285 of FIG. 2B.

At 290c, the method can include determining, based on the data relating to the AI model and the network-related information associated with the first RAN, that the AI model can be leveraged by the first RAN to improve network performance of the first RAN. For example, the AI model synchronization system 240a can determine, based on the data relating to the AI model and the network-related information associated with the first RAN, that the AI model can be leveraged by the first RAN to improve network performance of the first RAN in a manner similar to that described above with respect to the system 200 of FIG. 2A and/or the system 285 of FIG. 2B.

At 290d, the method can include performing synchronization with the AI model synchronization system to obtain the AI model. For example, the AI model synchronization system 240a can perform synchronization with the AI model synchronization system to obtain the AI model in a manner similar to that described above with respect to the system 200 of FIG. 2A and/or the system 285 of FIG. 2B.

At 290e, the method can include causing the first RIC to deploy the AI model in the first RAN. For example, the AI model synchronization system 240a can cause the first RIC to deploy the AI model in the first RAN in a manner similar to that described above with respect to the system 200 of FIG. 2A and/or the system 285 of FIG. 2B.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2D:
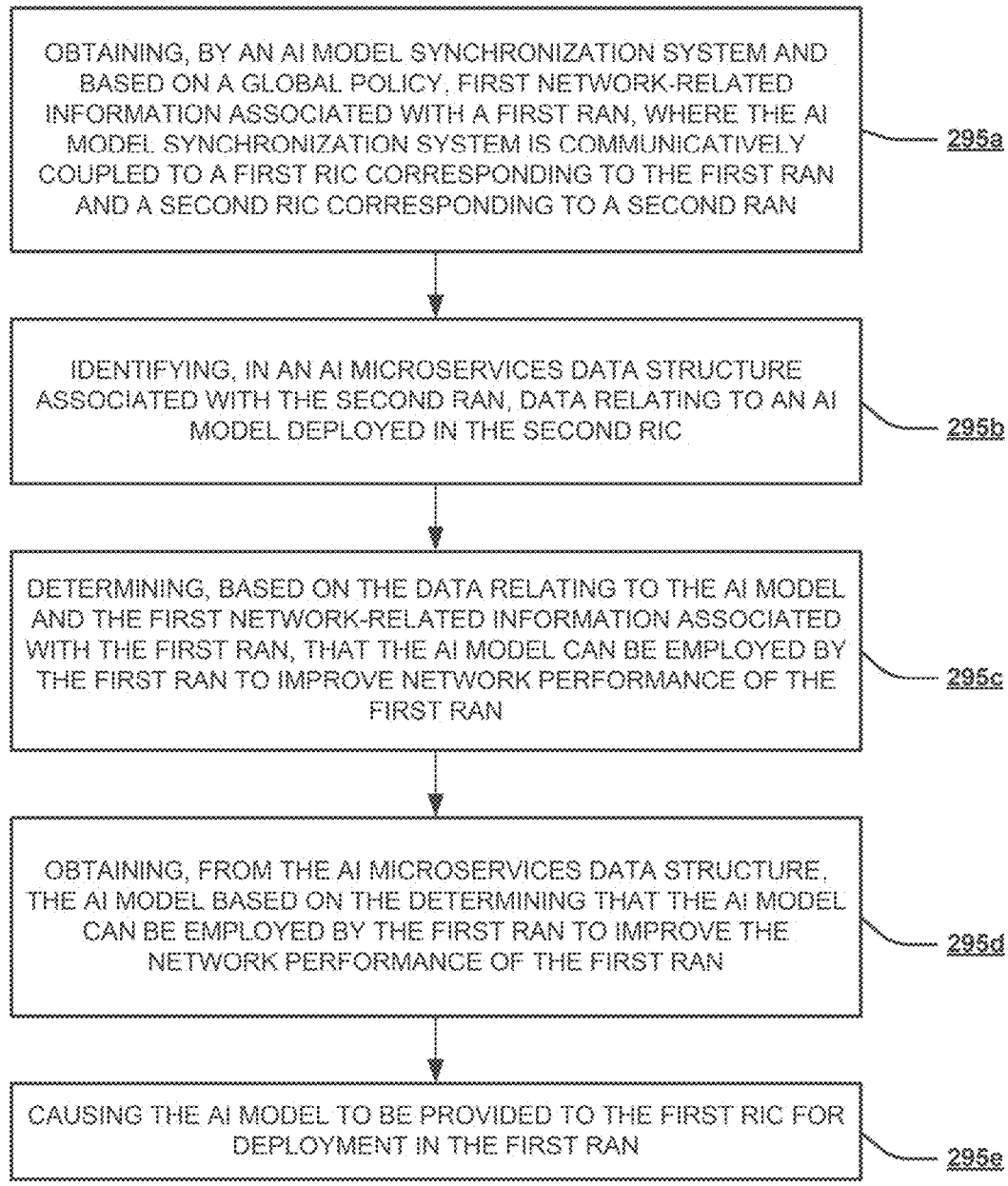
FIG. 2D depicts an illustrative embodiment of a method in accordance with various aspects described herein.

FIG. 2D depicts an illustrative embodiment of a method 295 in accordance with various aspects described herein. In some embodiments, one or more process blocks of FIG. 2D can be performed by an AI model synchronization system, such as the AI model synchronization system 240a, the AI model synchronization system 240b, or the like. In some embodiments, one or more process blocks of FIG. 2D may be performed by another device or a group of devices separate from or including the AI model synchronization system, such as the microservices data structure 241a, the microservices data structure 241*b*, or the like, the RAN 202*a*, the RAN 202*b*, or the like, the network service management platform 203*a*, the network service management platform 203*b*, or the like, the RIC 204*a*, the RIC 204*b*, or the like, the RIC portion 204*a*-1, the RIC portion 204*b*-1, or the like, the RIC portion 204*a*-2, the RIC portion 204*b*-2, or the like, the CU 214*a*, the CU 214*b*, or the like, the CU applications layer 224*a*, the CU applications layer 224*b*, or the like, the CU-CP & CU-UP 234*a*, the CU-CP & CU-UP 234*b*, or the like, the DUs 206*a*, the DUs 206*b*, or the like, the RUs 208*a*, the RUs 208*b*, or the like, the UEs 210*a*, the UEs 210*b*, or the like, etc.

At 295*a*, the method can include obtaining, by an AI model synchronization system and based on a global policy, first network-related information associated with a first RAN, where the AI model synchronization system is communicatively coupled to a first RIC corresponding to the first RAN and a second RIC corresponding to a second RAN. For example, the AI model synchronization system can obtain, by an AI model synchronization system and based on a global policy, first network-related information associated with a first RAN in a manner similar to that described above with respect to the system 200 of FIG. 2A and/or the system 285 of FIG. 2B, where the AI model synchronization system is communicatively coupled to a first RIC corresponding to the first RAN and a second RIC corresponding to a second RAN.

At 295*b*, the method can include identifying, in an AI microservices data structure associated with the second RAN, data relating to an AI model deployed in the second RIC. For example, the AI model synchronization system can identify, in an AI microservices data structure associated with the second RAN, data relating to an AI model deployed in the second RIC in a manner similar to that described above with respect to the system 200 of FIG. 2A and/or the system 285 of FIG. 2B.

At 295*c*, the method can include determining, based on the data relating to the AI model and the first network-related information associated with the first RAN, that the AI model can be employed by the first RAN to improve network performance of the first RAN. For example, the AI model synchronization system can determine, based on the data relating to the AI model and the first network-related information associated with the first RAN, that the AI model can be employed by the first RAN to improve network performance of the first RAN in a manner similar to that described above with respect to the system 200 of FIG. 2A and/or the system 285 of FIG. 2B.

At 295*d*, the method can include obtaining, from the AI microservices data structure, the AI model based on the determining that the AI model can be employed by the first RAN to improve the network performance of the first RAN. For example, the AI model synchronization system can obtain, from the AI microservices data structure, the AI model based on the determining that the AI model can be employed by the first RAN to improve the network performance of the first RAN in a manner similar to that described above with respect to the system 200 of FIG. 2A and/or the system 285 of FIG. 2B.

At 295*e*, the method can include causing the AI model to be provided to the first RIC for deployment in the first RAN. For example, the AI model synchronization system can cause the AI model to be provided to the first RIC for deployment in the first RAN in a manner similar to that described above with respect to the system 200 of FIG. 2A and/or the system 285 of FIG. 2B.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communications network in accordance with various aspects described herein. In particular a virtualized communications network is presented that can be used to implement some or all of the subsystems and functions of system 100, the subsystems and functions of system 200, the subsystems and functions of system 285, and methods 290 and 295 presented in FIGS. 1, 2A, 2B, 2C, and 2D. For example, virtualized communications network 300 can facilitate, in whole or in part, synchronization (e.g., federation), sharing, or exchange of pre-trained and ready-to-use AI (e.g., ML) models among multiple RANs, such as, for example, 5G vRANs.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
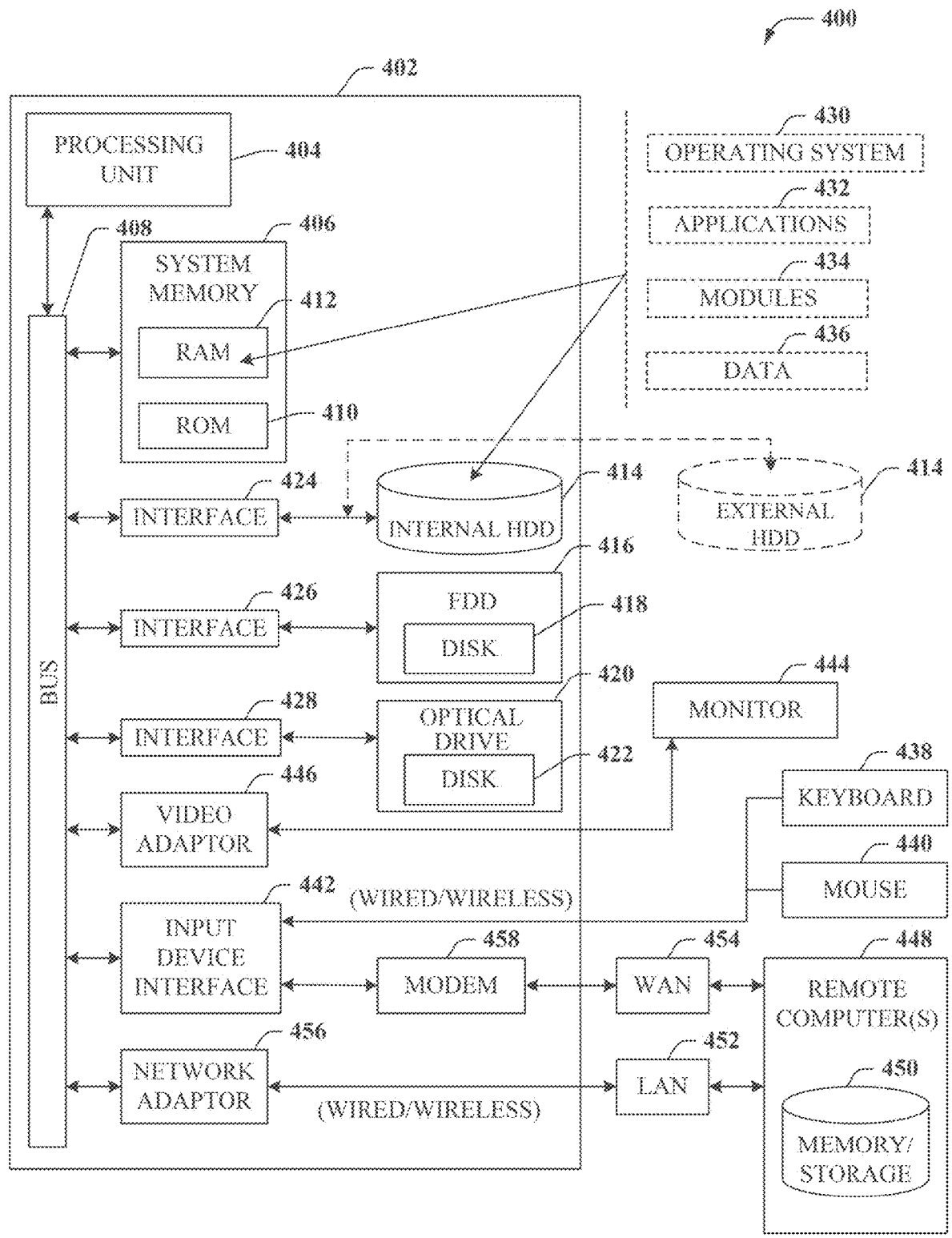
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, synchronization (e.g., federation), sharing, or exchange of pre-trained and ready-to-use AI (e.g., ML) models among multiple RANs, such as, for example, 5G vRANs.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
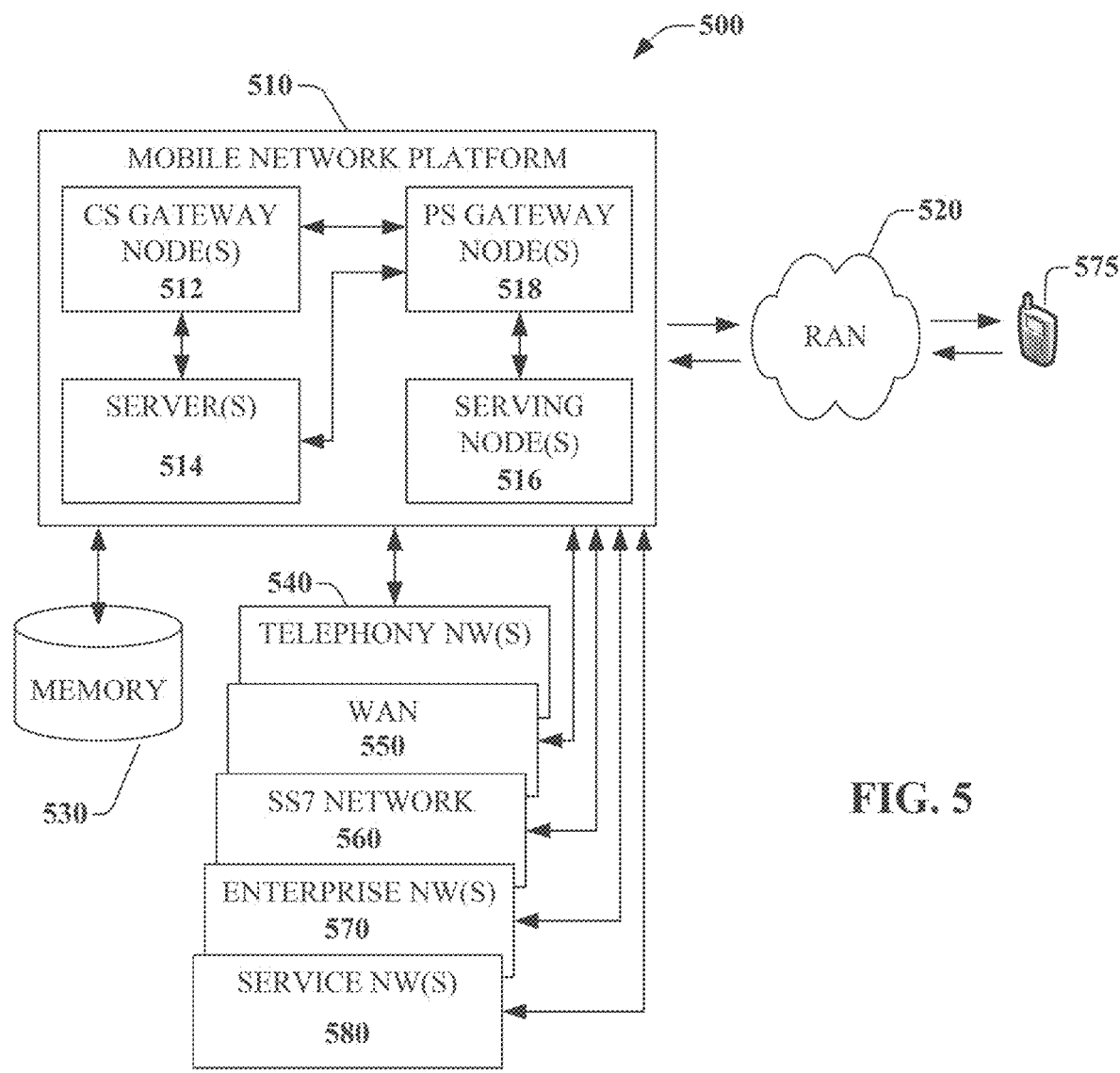
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, synchronization (e.g., federation), sharing, or exchange of pre-trained and ready-to-use AI (e.g., ML) models among multiple RANs, such as, for example, 5G vRANs. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1 that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
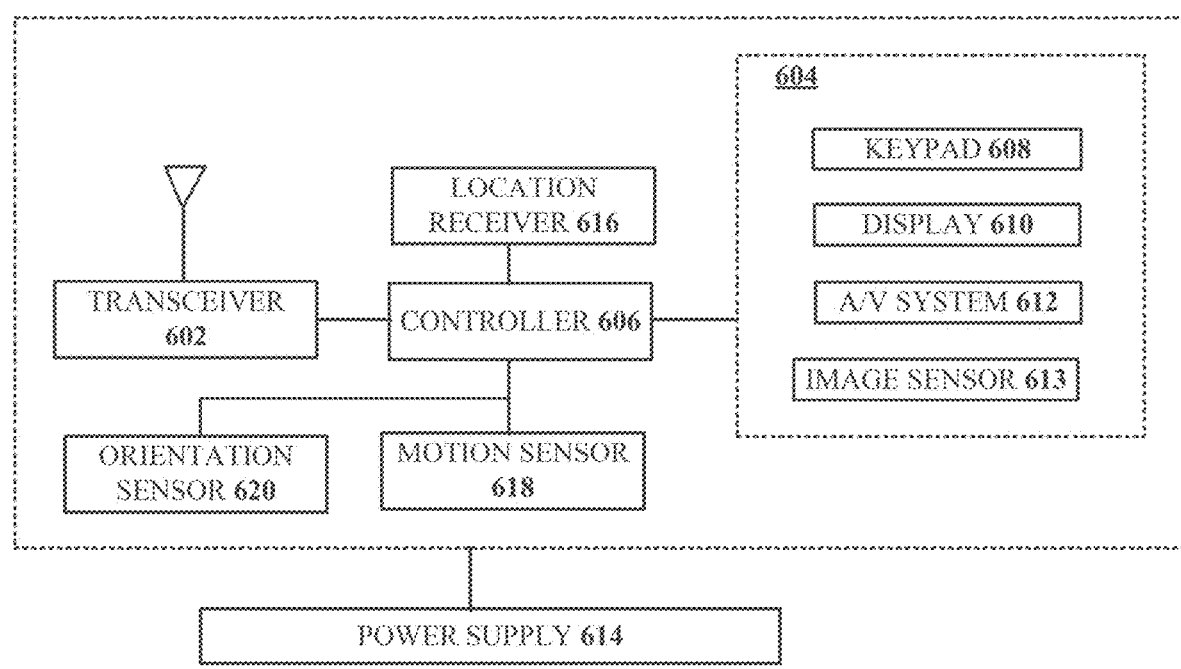
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate, in whole or in part, synchronization (e.g., federation), sharing, or exchange of pre-trained and ready-to-use AI (e.g., ML) models among multiple RANs, such as, for example, 5G vRANs.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor, wherein the processing system is associated with a first radio access network (RAN) that includes a first RAN intelligent controller (RIC); and
   a memory that stores executable instructions that, when executed by the processing system, facilitate performance of operations, the operations comprising:
   obtaining, from an artificial intelligence (AI) model synchronization system associated with a second RAN, data relating to an AI model deployed by a second RIC of the second RAN, wherein the processing system, the first RAN, and the first RIC are operated by a first network provider, wherein the AI model synchronization system, the second RAN, and the second RIC are operated by a second network provider different from the first network provider, and wherein the processing system is communicatively coupled with the AI model synchronization system to facilitate exchanges of deployed AI models between the first network provider and the second network provider;
   determining, based on the data relating to the AI model and network-related information associated with the first RAN, that the AI model can be leveraged by the first RAN to improve traffic management of the first RAN, throughput of the first RAN, resource allocation of the first RAN, or a combination thereof;
   responsive to the determining, receiving the AI model from the AI model synchronization system, wherein the receiving the AI model is in accordance with one or more AI model subscriptions with the AI model synchronization system; and
   causing the first RIC to deploy the AI model in the first RAN after the receiving the AI model, wherein the first RIC comprises a RIC message router (RMR) message bus, wherein the AI model is configured with a Representational State Transfer (REST) interface, and wherein the AI model is deployed in a container along with an AI microservice adapter that facilitates intra-container function calls for providing protocol conversion between the REST interface and the RMR message bus.

2. The device of claim 1, wherein at least one of the first RAN and the second RAN is a virtualized RAN (vRAN).

3. The device of claim 1, wherein the network-related information includes telemetry data, network performance information, network traffic information, or a combination thereof.

4. The device of claim 1, wherein the data relating to the AI model includes metadata, and wherein the metadata includes telemetry data, network performance information, network traffic information, information regarding performance of the AI model under one or more operating conditions, information regarding performance of the AI model across one or more configurations of the AI model, or a combination thereof.

5. The device of claim 1, wherein the determining comprises comparing the data relating to the AI model and the network-related information associated with the first RAN.

6. The device of claim 1, wherein the receiving the AI model involves utilizing one or more application programming interfaces (APIs).

7. The device of claim 1, wherein the receiving the AI model is conducted over an interface between the processing system and the AI model synchronization system.

8. The device of claim 1, wherein the AI microservice adapter is configured to run as an xApp.

9. The device of claim 1, wherein the AI model and the AI microservice adapter are executed in the container as separate processes.

10. The device of claim 1, wherein the AI microservice adapter is configured to adapt the AI model based on configuration data, and wherein the configuration data includes:
   information regarding functions relating to an AI microservice;
   information regarding inputs;
   information regarding outputs;
   identification of messages, to detect for on a bus associated with the first RIC, that call or utilize the functions;

identification of messages to deliver on the bus relating to the functions;

information regarding how messages are to be translated into calls;

information regarding how responses to messages from an AI microservice are to be translated and placed onto the bus;

information regarding endpoints of an AI microservice;

information regarding a location at which an AI microservice is running; or a combination thereof.

11. A non-transitory machine-readable medium, comprising executable instructions that, when executed by a processing system of a first radio access network (RAN) that includes a first RAN intelligent controller (RIC), facilitate performance of operations, the operations comprising:

receiving, from an artificial intelligence (AI) model synchronization system associated with a second RAN, data relating to an AI model utilized by a second RIC of the second RAN, wherein the processing system, the first RAN, and the first RIC are operated by a first network provider, wherein the AI model synchronization system, the second RAN, and the second RIC are operated by a second network provider different from the first network provider, and wherein the processing system is communicatively coupled with the AI model synchronization system to facilitate exchanges of deployed AI models between the first network provider and the second network provider;

identifying, based on the data relating to the AI model and network-related information associated with the first RAN, that the AI model can be utilized by the first RAN to manage traffic of the first RAN, throughput of the first RAN, resource allocation of the first RAN, or a combination thereof;

based on the identifying, obtaining the AI model from the AI model synchronization system, wherein the obtaining the AI model is in accordance with an AI model subscription with the AI model synchronization system; and causing the first RIC to utilize the AI model in the first RAN after the obtaining the AI model, wherein the first RIC comprises a RIC message router (RMR) message bus, wherein the AI model is configured with a Representational State Transfer (REST) interface, and wherein the AI model is deployed in a container along with an AI microservice adapter that facilitates intra-container function calls for providing protocol conversion between the REST interface and the RMR message bus.

12. The non-transitory machine-readable medium of claim 11, wherein at least one of the first RAN and the second RAN is a virtualized RAN (vRAN).

13. The non-transitory machine-readable medium of claim 11, wherein the network-related information includes telemetry data, network performance information, network traffic information, or a combination thereof.

14. The non-transitory machine-readable medium of claim 11, wherein the data relating to the AI model includes metadata, and wherein the metadata includes telemetry data, network performance information, network traffic information, information regarding performance of the AI model under one or more operating conditions, information regarding performance of the AI model across one or more configurations of the AI model, or a combination thereof.

15. The non-transitory machine-readable medium of claim 11, wherein the identifying comprises comparing the data relating to the AI model and the network-related information associated with the first RAN.

16. A method, comprising:

causing, by a processing system of a first radio access network (RAN) intelligent controller (RIC) of a first RAN including a processor, network-related information associated with the first RAN to be provided to a first artificial intelligence (AI) model synchronization system, wherein providing the network-related information associated with the first RAN to the first AI model synchronization system enables the first AI model synchronization system to obtain, from a second AI model synchronization system associated with a second RAN, data relating to an AI model deployed by a second RIC of the second RAN, determine, based on the data relating to the AI model and the network-related information associated with the first RAN, that the AI model is capable of improving traffic management of the first RAN, throughput of the first RAN, resource allocation of the first RAN, or a combination thereof, and receive the AI model from the second AI model synchronization system in accordance with one or more AI model subscriptions with the second AI model synchronization system, wherein the first AI model synchronization system, the first RAN, and the first RIC are operated by a first network provider, wherein the second AI model synchronization system, the second RAN, and the second RIC are operated by a second network provider different from the first network provider, and wherein the first AI model synchronization system is communicatively coupled with the second AI model synchronization system to facilitate exchanges of deployed AI models between the first network provider and the second network provider;

obtaining, by the processing system, the AI model from the first AI model synchronization system responsive to the causing the network-related information associated with the first RAN to be provided to the first AI model synchronization system; and causing, by the processing system, the AI model to be employed in the first RIC responsive to the obtaining the AI model from the first AI model synchronization system, wherein the first RIC comprises a RIC message router (RMR) message bus, wherein the AI model is configured with a Representational State Transfer (REST) interface, and wherein the AI model is deployed in a container along with an AI microservice adapter that facilitates intra-container function calls for providing protocol conversion between the REST interface and the RMR message bus.

17. The method of claim 16, wherein at least one of the first RAN and the second RAN is a virtualized RAN (vRAN).

18. The method of claim 16, wherein the AI model provides one or more RAN-based microservices.

19. The method of claim 16, wherein the one or more AI model subscriptions are associated with one or more application programming interfaces (APIs).

20. The method of claim 16, wherein the data relating to the AI model includes metadata, and wherein the metadata includes telemetry data, network performance information, network traffic information, information regarding performance of the AI model under one or more operating conditions, information regarding performance of the AI model across one or more configurations of the AI model, or a combination thereof.

* * * * *